US009401760B2

(12) United States Patent
Skirmont et al.

(10) Patent No.: US 9,401,760 B2
(45) Date of Patent: *Jul. 26, 2016

(54) DIAGNOSTIC PORT FOR INTER-SWITCH LINK TESTING IN ELECTRICAL, OPTICAL AND REMOTE LOOPBACK MODES

(71) Applicant: Brocade Communications Systems, Inc., San Jose, CA (US)

(72) Inventors: David Aaron Skirmont, Los Gatos, CA (US); Saumitra Buragohain, San Jose, CA (US); Balakrishna Wusirika, Pleasanton, CA (US); Badrinath Kollu, San Jose, CA (US); Kyuh Kim, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/315,800

(22) Filed: Jun. 26, 2014

(65) Prior Publication Data

US 2014/0308032 A1  Oct. 16, 2014

Related U.S. Application Data

(63) Continuation of application No. 13/047,513, filed on Mar. 14, 2011, now Pat. No. 8,798,456.

(60) Provisional application No. 61/379,150, filed on Sep. 1, 2010.

(51) Int. Cl.
*H04B 10/08* (2006.01)
*H04B 10/079* (2013.01)
*H04B 10/077* (2013.01)
(Continued)

(52) U.S. Cl.
CPC .......... *H04B 10/0795* (2013.01); *H04B 10/073* (2013.01); *H04B 10/077* (2013.01); *H04B 10/079* (2013.01); *H04B 10/0773* (2013.01); *H04B 10/0775* (2013.01); *H04B 10/0779* (2013.01); *H04B 10/0793* (2013.01); *H04B 10/0799* (2013.01); *H04B 10/27* (2013.01)

(58) Field of Classification Search
CPC ............ H04J 14/022; H04J 14/0221–14/0227; H04B 10/03–10/0799; H04Q 11/00–11/0071
See application file for complete search history.

(56) References Cited

U.S. PATENT DOCUMENTS

| 7,397,788 B2 | 7/2008 | Mies et al. |
| 2002/0104039 A1 | 8/2002 | DeRolf et al. |
| 2003/0120984 A1* | 6/2003 | Chuah ................. H04L 12/2697 714/716 |

(Continued)

OTHER PUBLICATIONS

Brocade Communication Systems, Inc.; "Fabric OS Administrator's Guide", Supporting Fabric OS v5.3.0; Publication No. 53-1000448-01; Jun. 15, 2007.

(Continued)

*Primary Examiner* — Li Liu
(74) *Attorney, Agent, or Firm* — Blank Rome, LLP

(57) ABSTRACT

A diagnostic testing utility is used to perform single link diagnostics tests including an electrical loopback test, an optical loopback test, a link traffic test, and a link distance measurement test. To perform the diagnostic tests, two ports at each end of a link are identified and then statically configured by a user. The ports will be configured as D_Ports and as such will be isolated from the fabric with no data traffic flowing through them. The ports will then be used to send test frames to perform the diagnostic tests.

23 Claims, 7 Drawing Sheets

(51) Int. Cl.
*H04B 10/073* (2013.01)
*H04B 10/27* (2013.01)

(56) References Cited

U.S. PATENT DOCUMENTS

| | | |
|---|---|---|
| 2004/0071389 A1 | 4/2004 | Hofmeister et al. |
| 2006/0093372 A1* | 5/2006 | Hahin .................... H04B 10/50 398/135 |
| 2008/0232794 A1 | 9/2008 | Absillis et al. |
| 2009/0202239 A1* | 8/2009 | Holness .................... H04J 3/14 398/33 |
| 2009/0214221 A1* | 8/2009 | Li .......................... H04B 10/40 398/136 |

OTHER PUBLICATIONS

Brocade Communication Systems, Inc.; "Fabric OS Command Reference Manual", Supporting Fabric OS v6.0.0; Publication No. 53-1000599-01; Oct. 19, 2007.

Brocade Communications Systems, Incorporated; "Fabric OS" Command Reference Manual, Supporting Fabric OS 6.1.0, #53-1000599-02, Mar. 12, 2008.

* cited by examiner

DIAGNOSTIC PORT FOR INTER-SWITCH LINK TESTING IN ELECTRICAL, OPTICAL AND REMOTE LOOPBACK MODES

CROSS-REFERENCE TO RELATED APPLICATIONS

This application is a continuation of U.S. patent application Ser. No. 13/047,513 filed Mar. 14, 2011, entitled "Diagnostic Port for Inter-Switch Link Testing in Electrical, Optical and Remote Loopback Modes", which claims the benefit of U.S. Provisional Application No. 61/379,150 filed Sep. 1, 2010, the entire contents of which are incorporated herein by reference.

TECHNICAL FIELD

The present invention relates to the field of computer networking, and in particular to techniques for performing link level diagnostics in a switch fabric.

BACKGROUND

Storage area networks (SANs) are typically implemented to interconnect data storage devices and data servers or hosts, using network switches to provide interconnectivity across the SAN. SANs may be complex systems with many interconnected computers, switches, and storage devices. The switches are typically configured into a switch fabric, and the hosts and storage devices are connected to the switch fabric through ports of the network switches that comprise the switch fabric. Most commonly, Fibre Channel (FC) protocols are used for data communication across the switch fabric, as well as for the setup and teardown of connections to and across the fabric, although these protocols may be implemented on top of Ethernet or Internet Protocol (IP) networks.

Many SANs rely on the FC protocol. The FC protocol defines standard media and signaling conventions for transporting data in a serial fashion. It also provides an error correcting channel code and a frame structure for transporting the data. Many FC switches provide at least some degree of automatic configurability. For example, they may automatically sense when a new inter-switch link (ISL) becomes active, and may initiate an initialization process to discover what the link connects to. The switch may automatically determine various parameters for the link (e.g. link speed). As FC networks are created, updated, maintained and de-commissioned, switches may be enabled, disabled or reconfigured, and links may be added or removed.

Over time, FC networks have become more complex, with multiple fabrics involving several switches that use inter-switch links (ISLs) connected to switch ports (E_ports) on the switches. As FC networks have become more complex, the network speeds have also increased significantly. As faster networks are implemented, media and cable tolerance become more important for avoiding degraded performance and cyclic redundancy check (CRC) errors. At the same time, as larger networks are developed, diagnostic of optics and cables become more and more time consuming and intrusive. Current switches have two basic types of built-in diagnostics. First, the SFP electro-optical modules have digital diagnostics, but these only operate at the SFP component level. Second, a command line interface (CLI) tool may be provided to allow frames to be injected and circulated on a specific link, but the end result is only a good and bad indication, which does not greatly aid diagnosis. Thus, troubleshooting suspected link errors with the existing built-in tools is time consuming and can become a daunting task. The use of external separate testing tools is also cumbersome and brings along separate problems not present with built-in tools It would be desirable to implement an efficient network diagnostic method to more efficiently troubleshoot larger networks, thereby improving the speed, efficiency, and reliability of these networks.

SUMMARY

In one embodiment, a network link level diagnostic tool is disclosed. The diagnostic tool can monitor and set alerts for digital diagnostics, test both ends of the connectivity to validate that the links are within budget, saturate a link with a representative SAN traffic profile to validate fabric performance, monitor and trend for the integrity of the optics during its operational life cycle, and granularly measures cable distance to determine physical limitation or performance degradation of the link over time.

BRIEF DESCRIPTIONS OF THE DRAWINGS

DETAILED DESCRIPTIONS

Figure 1:
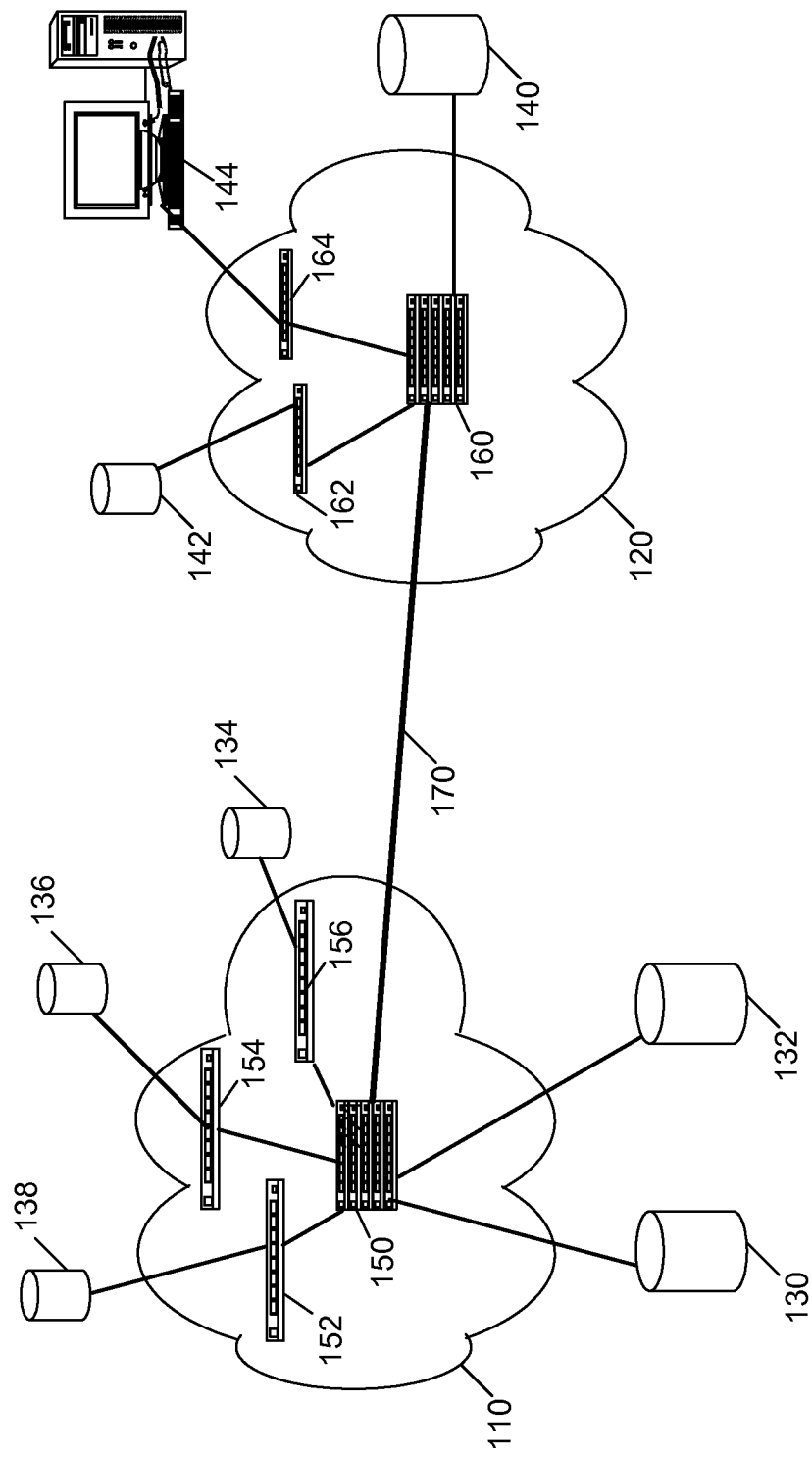
FIG. 1 is a block diagram illustrating an exemplary Fibre Channel network.

An exemplary FC network is illustrated in FIG. 1. As illustrated, the FC network of FIG. 1 it includes two FC fabrics, a fabric 110 and a fabric 120. The fabric 120 includes switches 160, 162, 164 which are coupled to each other via ISLs and are each also connected to either a storage device or a computer system. For example, switch 164 is coupled to the computer system 144 and switch 162 is coupled to a storage device 142. The computer system 144 may be any suitable node device including a desktop computer, a server, or a user terminal. The FC fabric 110 is shown having three switches 150, 152 and 154 coupled together via ISLs. These switches are also each coupled to one or more storage devices. Switch 150 is coupled to storage devices 130 and 132, while switch 154 is coupled to storage device 136, and switch 152 is coupled to storage device 138. The switches 150 and 160 each have a router port which are connected to each other by link 170. By using router ports instead of typical E_Ports, the fabrics 110 and 120 stay separate and do not merge into a single fabric.

Each of the storage devices shown in FIG. 1 may be any suitable node device including a JBOD (Just a Bunch of Disks), RAID (Redundant Array of Inexpensive Disks) array, tape library, or network data store. Each of the switches may have as few as two and as many as 256 or more ports.

As illustrated in FIG. 1, FC networks can be complex. As such, diagnosing possible errors or faulty links in these networks can be challenging. To more efficiently troubleshoot large networks and improve the speed, efficiency, and reliability of the networks, the inventors provide a method of diagnosing potential problems in inter-switch links using diagnostic ports ("D_Port").

D_Ports are ports that are statically configured by the user for the purpose of running diagnostics. In a preferred embodiment of the present invention, any FC port can be configured as a D_Port. However, once a port is configured as a D_Port, it will no longer be part of the fabric as it will not carry any inter-switch or data traffic. A D_Port will also not merge fabrics. The D_Port is only used for link diagnostic purposes and to isolate link level faults.

Accordingly, a D_Port is configured to run one or more link level diagnostic tests with minimal user intervention and provide comprehensive test results. The diagnostic tests performed by a D_Port achieve one or more of the following: 1) test both ends of a link's connectivity to validate that the link is within dB budget; 2) saturate a link with a representative SAN traffic profile to validate fabric performance; and 3) monitor and determine trends for the integrity of the optics during its operational life cycle.

In a preferred embodiment of the present invention, two different software modules are used. The operation and configurability of D_Ports are handled by the fabric module. In the preferred embodiment, the fabric module implements the Fibre Channel Switch Fabric (FCSF) standard. The fabric module follows the FCSF standard for fabric initialization processes, such as determining the E_ports, assigning unique domain IDs to switches, throttling the trunking process, and distributing the domain and alias list to all switches in the fabric. The fabric module also performs D_Port related operations such as reading small form-factor pluggable (SFP) capabilities and sending out state change notices (SCNs) of the D_Port to notify other modules in the preferred embodiment. The fabric module performs some of these D_Port related operations through the use of switch drivers. The diag module is the diagnostics module and implements the spinfab CLI command.

In some embodiments, D_Port diagnostics may be performed on E_ports connected to ISLs between network switches in the fabric. In other embodiments, D_Port diagnostics may be performed on F_ports connected to links to N_ports on devices. In yet other embodiments, D_Port diagnostics may be performed on E_ports, F_ports, and N_ports. For clarity, the discussion below is typically written in terms of, D_Port diagnostics using E_ports, but similar techniques may be used for, D_Port diagnostics in F_ports and N_ports. Some of these conditions may only apply to E_ports, while others may only apply to F_ports or N_ports, and others may apply to any port.

Figure 2:
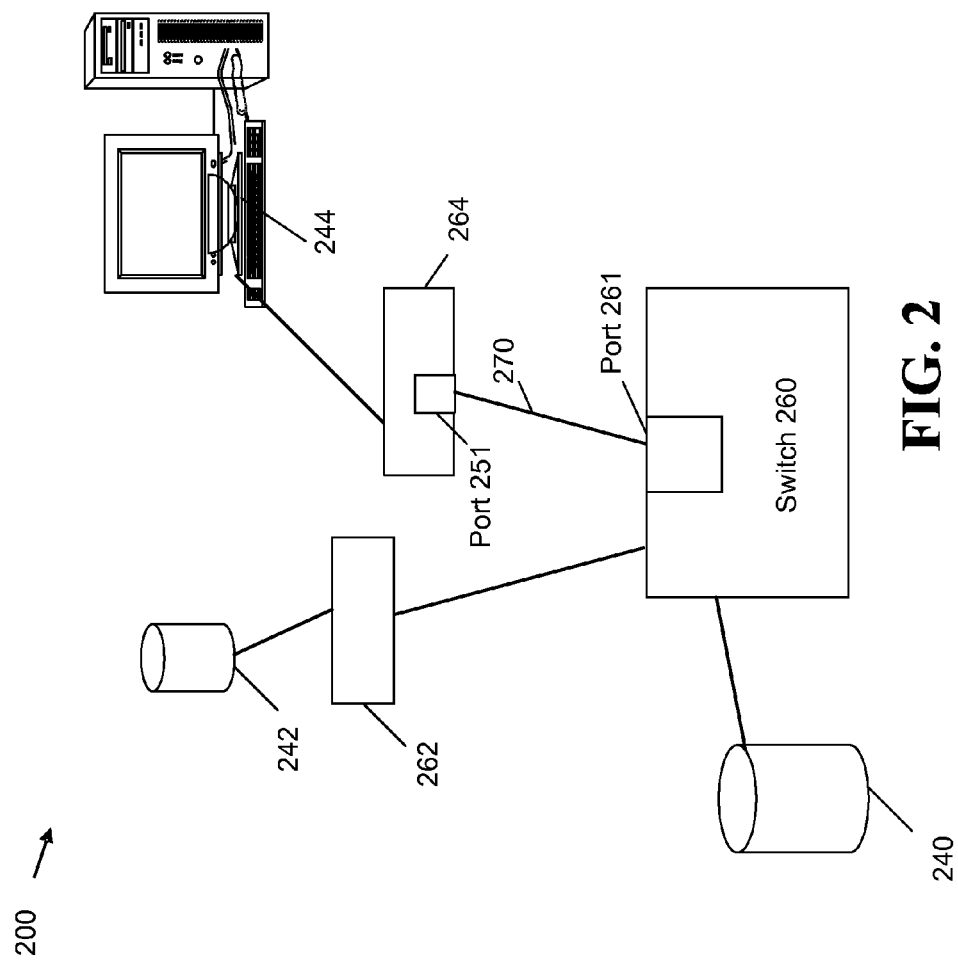
FIG. 2 is a block diagram illustrating an exemplary Fibre Chancel network implementing D_Port diagnostics according to one embodiment.

FIG. 2 is a block diagram illustrating a FC network which implements one embodiment of the use of D_Ports. FIG. 2 illustrates switches 260, 262 and 264. Each of these switches is coupled to one or more storage devices or computer systems. For example, switch 264 is coupled to the computer system 244, switch 262 is coupled to the storage device 242, and switch 260 is coupled to the storage device 240. Some of the switches are also coupled to each other through ISLs. For example, switch 260 is coupled through ports 261 and 251 to switch 264.

Although illustrated in FIG. 2 as a single chassis, the switches 260 and 264 may comprise a plurality of network switches in one or more chassis. In the network 200, hosts and devices are connected into a SAN using the switches. (The numbers of storage devices and switches are illustrative and by way of example only, and any desired number of storage devices and switches may be connected in the network 200.)

As can be seen in FIG. 2, the connections between the switches create inter-switch links. As such, switches 264 and 260 are coupled to each other through the inter-switch link 270. Each of the inter-switch links can be diagnosed in accordance with the preferred embodiment of the present invention. For example, the inter-switch link 270 can be diagnosed to detect potential faults and validate inter-switch connectivity. To do this the two ports at each end of the link would first need to be configured as D_Ports. The exemplary steps involved in configuring the ports as D_Ports are illustrated in the flow chart of FIG. 4.

Figure 3:
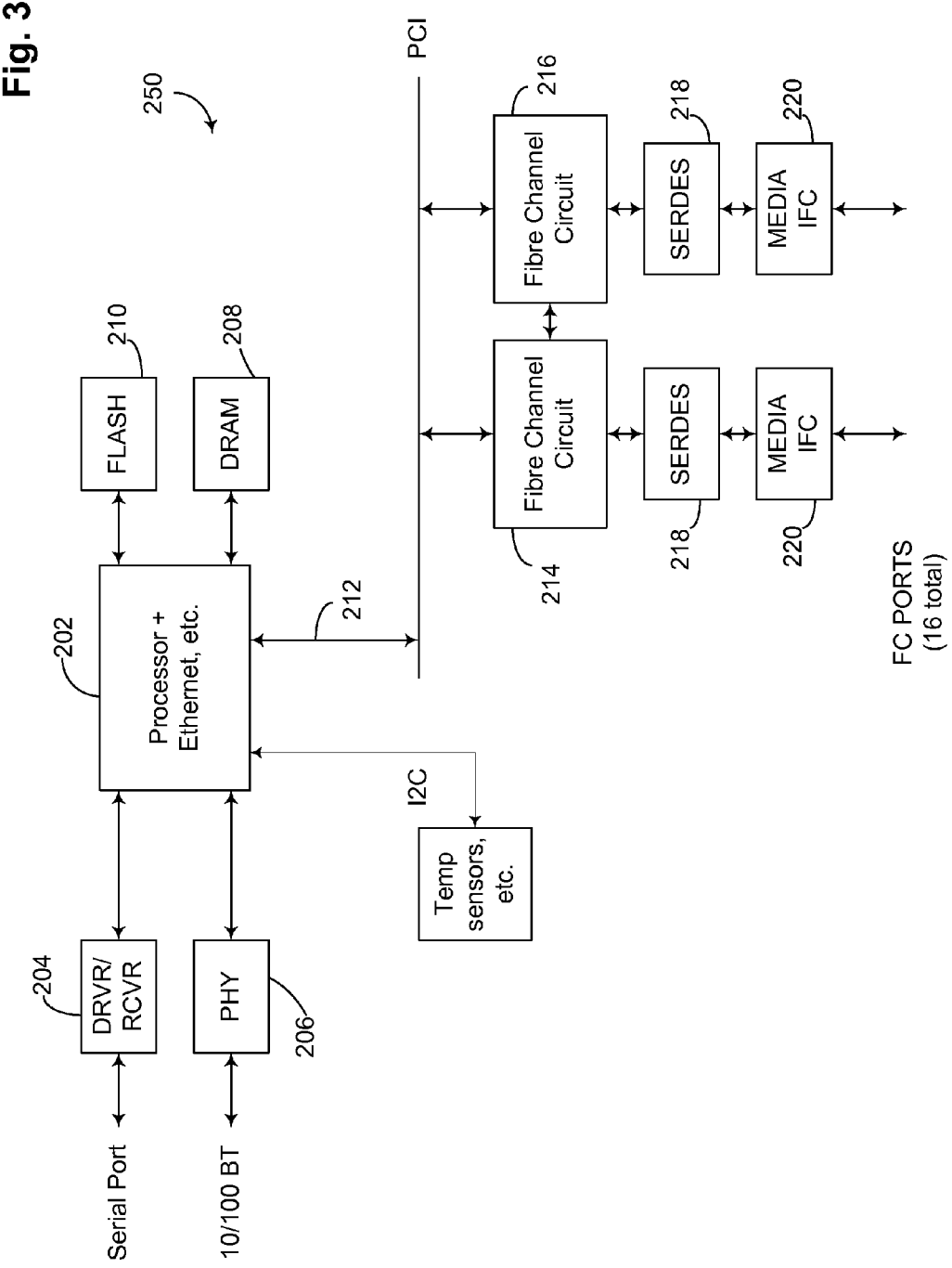
FIG. 3 is a block diagram of an exemplary switch.

FIG. 3 illustrates a basic block diagram of a switch 250, such as switches 260, 262, or 264 according to the preferred embodiment of the present invention. A processor and I/O interface complex 202 provides the processing capabilities of the switch 250. The processor may be any of various suitable processors, including the Freescale or IBM PowerPC. The I/O interfaces may include low speed serial interfaces, such as RS-232, which use a driver/receiver circuit 204, or high-speed serial network interfaces, such as Ethernet, which use a PHY circuit 206 to connect to a local area network (LAN). Main memory or DRAM 208 and flash or permanent memory 210, are connected to the processor complex 202 to provide memory to control and be used by the processor.

The processor complex 202 also includes an I/O bus interface 212, such as a PCI bus, to connect to Fibre Channel circuits 214 and 216. In one embodiment, the processor 202 runs the modules used in performing the diagnostics tests of the present invention. The Fibre Channel circuits 214, 216 in the preferred embodiment each contain eight Fibre Channel ports. Each port is connected to an external SERDES circuit 218, which in turn is connected to a media interface 220, conventionally an SPF, which receives the particular Fibre Channel medium used to interconnect switches used to form a fabric or to connect to various devices. SFPs according to the present invention include optical loopback capabilities to allow incoming frames to be looped back out within the SFP itself, rather than requiring a receiving ASIC to perform the looping within the necessary electro-optical conversions. Further, SFPs according to the present invention include internal electrical loopback capabilities to allow near end testing. The processor 202 uses the fabric module to communicate with the SPFs to set both the electrical and optical loopback modes.

Figure 4:
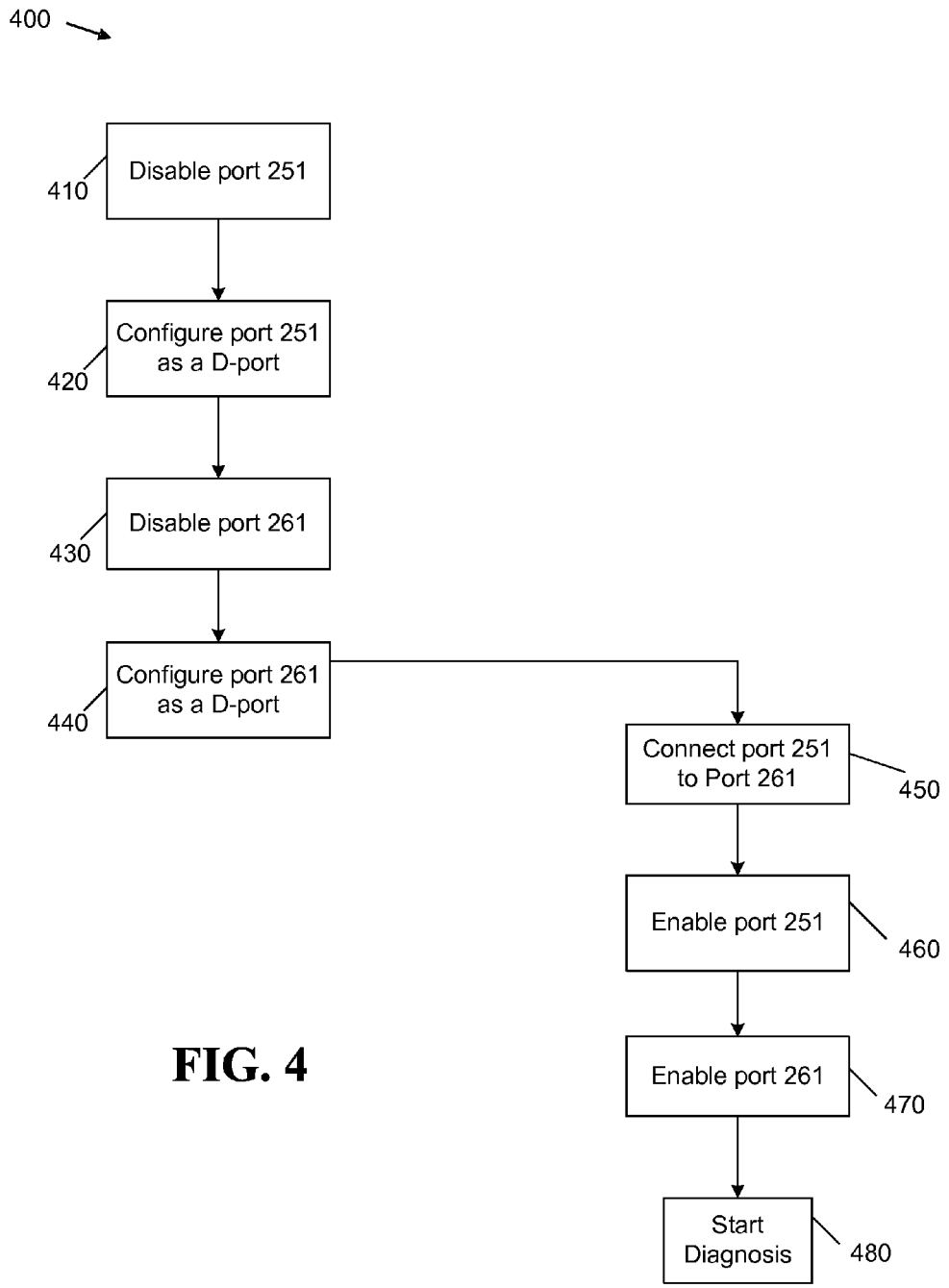
FIG. 4 is a flowchart illustrating a method for configuring network ports as D_Ports according to one embodiment.

As illustrated in FIG. 4, the method 400 starts at step 410 by disabling port 251. This is done so that the port is no longer part of the fabric and cannot carry data traffic. After the port has been disabled, the method goes on to configure port 251 as a D_Port, in step 420. After port 251 has been configured as a D_Port, the next step is to disable and configure port 261 as a D_Port in steps 430 and 440, respectively. After both ports have been configured as D_Ports, the method connects port 251 to port 261. When the two ports are connected, the method enables port 251 and port 261, at steps 460 and 470, respectively. In one embodiment, when both ports 251 and 261 have been have been enabled, the method is ready to start diagnosis at step 480. In another embodiment, the diagnostic tests will start automatically when the second port is enabled.

In one embodiment, the method 400 can be initiated by a user (e.g. a network administrator) through an application 248 accessed on an administrative workstation such as the computer system 244 of FIG. 2. The application 248 may include one or more user interfaces or GUIs (not shown) that enable the user to identify the ISL intended to be diagnosed and turn on a diagnostic mode. Turning on the diagnostic mode may start running the method 400 automatically on the identified ISL. In other embodiments, the user may initiate each step of the method 400. In one embodiment, the user is able to decide which diagnostic tests to run on the ISL. After the diagnostic tests have been performed, the result may be presented to the user for analysis.

The application 248 may be provided on any desired non-volatile computer-readable program storage media including, but not limited to, all forms of optical and magnetic, including solid-state, storage elements, including removable media. The application workstation 244 may be any desired type of computational device, including a virtualized computer executing on any real hardware platform desired.

In addition to using the application 248, D_ort diagnostics may use a command line interface (CLI) implemented on one of the switches 260 or 264 to allow the user to initiate the diagnosis. In such an embodiment, the diagnosis can be initiated using a port identifier as a parameter to the diagnostic command. The process may include querying the switches in the network 200 for the list of ports and then sending D_Port diagnostic requests for the selected ports. The diagnostic command may block waiting for completion of the diagnostic request. The command may also result in a message indicating successful or unsuccessful completion of the diagnostic tests and/or displaying the test results.

The diagnostics tests initiated at step 480 of method 400 include one or more of the following tests: 1) electrical loopback test; 2) optical loopback test; and 3) link traffic test. In one embodiment, a test initiator port, such as the port 510 illustrated in FIG. 5, initiates the diagnostic tests, while a port at the other end of the link, referred to as the test responder 520, responds. In one embodiment, the ports are designated as an initiator or responder based on a pre-determined characteristic of the ports such as their World Wide Number (WWN). For example, the port having a higher WWN may be designated as the initiator, while the port having a lower WWN may get designated as the responder.

Figure 5:
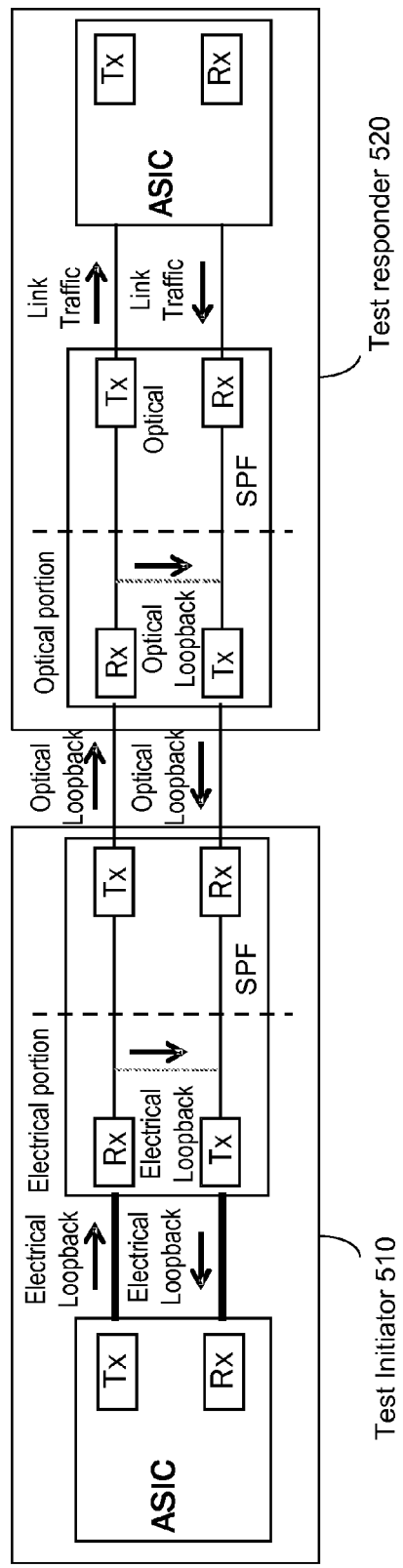
FIG. 5 is a block diagram illustrating the D_Port diagnostic tests performed on inter-switch links according to one embodiment.

As illustrated in FIG. 5, the electrical loopback test can occur at either the initiator or responder ports locally. In contrast, the optical loopback and the link traffic tests depend on the remote port to send the test frames back and should be performed using the remote port as well as the local port. In one embodiment, in order to perform the link traffic test both local and remote ports should be programmed to retransmit the frames received on that port. During the test, millions of test frames are injected into the local port transmit circuit. These frames are transmitted onto the link through the local SFP. The remote port receives the frames from the remote SFP and retransmits them back to the source port. The received frames are then checked for any errors.

In one embodiment, the link level tests involve an FC test utility referred to as spinfab. Spinfab is an online diagnostics command that can verify ISL links between switches at the maximum speed. The test is done by setting up the routing functionality in the hardware such that test frames received by an E_Port are retransmitted on the same E_Port. Several frames are then sent to ports attached to each active E_Port specified. These frames are special frames which never occur during normal traffic and the default action for such frames is to route them back to the sender. The frames are circulated between switches until the test stops them. The fabric module relies on the diag module for running spinfab.

Figure 6:
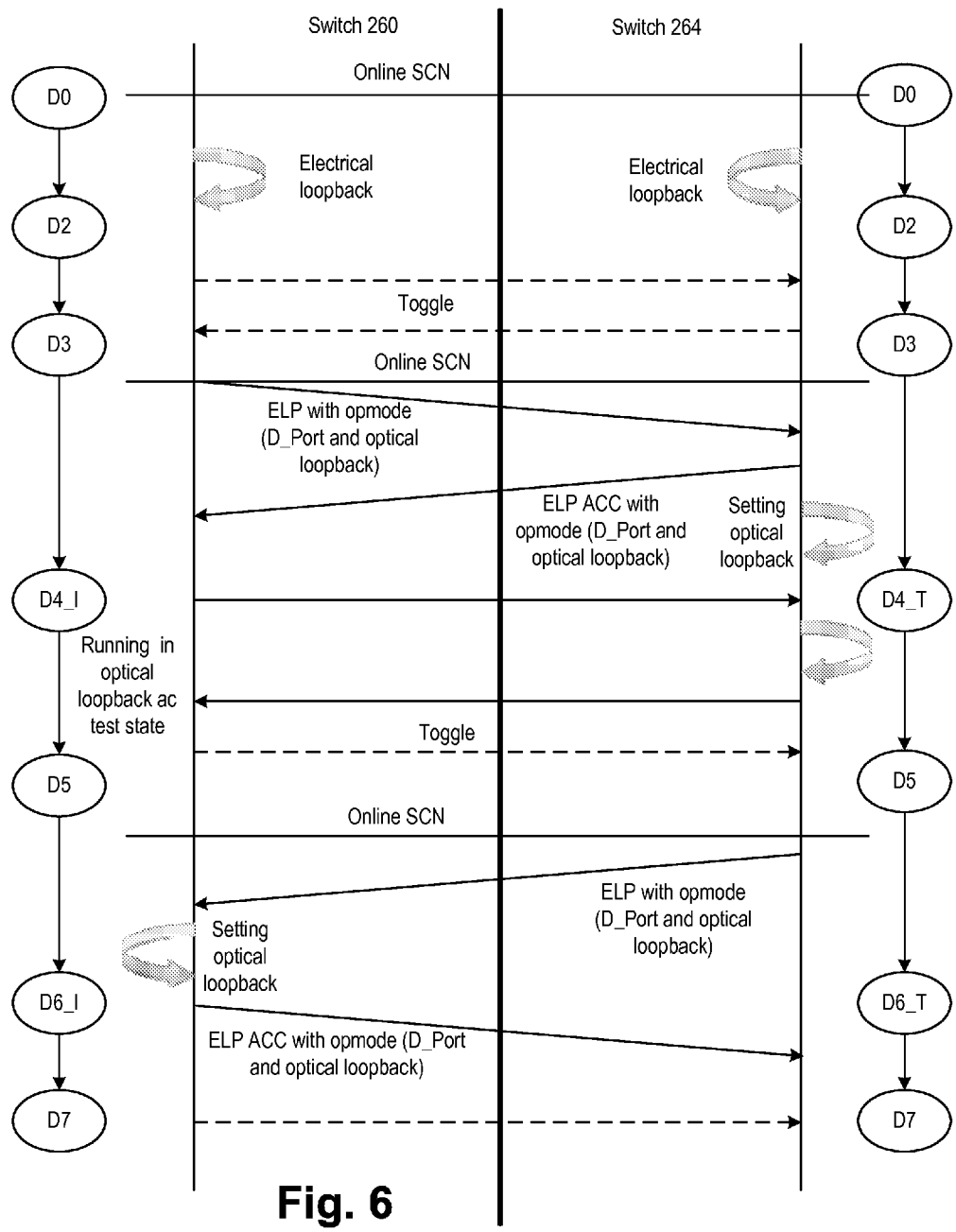
FIG. 6 is a ladder diagram illustrating the states of a D_Port as it will go through a D_Port diagnostic according to one embodiment.
Figure 7:
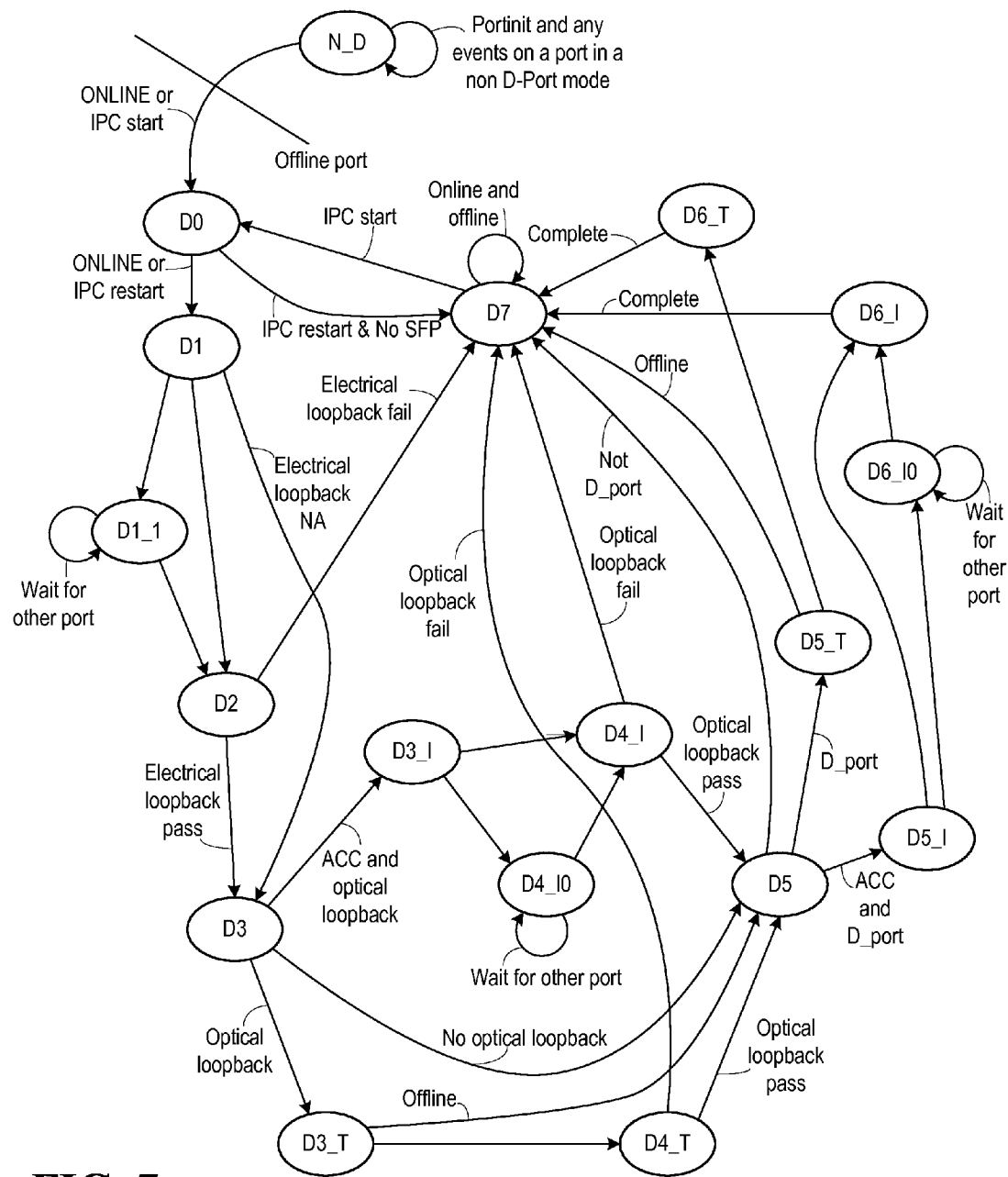
FIG. 7 is a graph diagrams illustrating the states of a D_Port as it will go through a D_Port diagnostic according to one embodiment.

FIGS. 6 and 7 illustrate ladder and state diagrams, respectively, showing the state of the D_Ports during the high-level actions performed to achieve D_Port diagnosis, according to one embodiment. As illustrated in FIG. 7, the D_Port state machine will start with the state NOT_D_PORT (N_D). A port will be initialized to an N_D state after the port structure is created. When the port receives a request to start the test with the D_Port mode enabled by either an ONLINE command from the fabric module based on an instruction from a management utility to have the port go online or an inter-process call (IPS) from a management utility, such as diag using the spinfab command directing starting of the test, it will transition from N_D to D_PORT_INIT (Do). As shown in FIGS. 6 and 7, the port will remain at the Do state until it receives an ONLINE command or an IPC call to restart the test. At this point, if an SFP module exists, the port will transition to the D_CU_LOOPBACK ($D_1$) state to perform an electrical loopback test. However, if the port is at the Do state and receives an ONLINE command or IPC call to restart the test while no SFP module exists, the port will transition to the D_PORT_FINAL ($D_7$) state and no testing will be performed.

At the D_CU_LOOPBACK ($D_1$) state, the port may transition to three different states. If the SFP is not capable of an electrical loopback, the port will be toggled and it will go directly to the D_OPTIC_LOOPBACK ($D_3$) state. However, if the SFP supports the electrical loopback test, it will be enabled and the port will go through all the states of E-port initialization from ONLINE to AC_PORT or active. At this stage, if an AC_PORT SCN command is received from the fabric module and another port is running the link test, the port will transition to the D_CU_LOOP_WAIT ($D_{1\_1}$) state and wait for the other port. While at the $D_{1\_1}$ state, the port either waits for the other port to complete the link test or the switch goes through fabric reconfiguration. In either case, the port will transition from $D_{1\_1}$ to the D_CU_LOOP_TEST ($D_2$) state. The port may also directly transition from $D_1$ to $D_2$, if an AC_PORT SCN is received and no other port is running the link test.

While at the $D_2$ state, the procedure will start the electrical loopback test and will enable a child process completion signal. The procedure will also start a timer for worst case scenario, in case the test does not complete. If the electrical loopback test fails or is aborted due to timeout, the port will transition from $D_2$ to the $D_7$ state and the diagnostic test will be stopped by setting the completion code to failure code. However, if the electrical loopback test is completed successfully, the port will transition from $D_2$ to the D_OPTIC_LOOPBACK ($D_3$) state. At this point, the electrical loopback will be cleared and the port will be toggled by the fabric module.

At the $D_3$ state, if the external cable is connected and the remote port SFP is capable of optical loopback, the port will perform an optical loopback test by going through all the states of E-port initialization from ONLINE to AC_PORT. At this point, port configuration bits will be checked during exchange link parameters (ELP) exchange and the optical loopback mode is exchanged in the ELP. The port configuration bits are newly defined bits in the flags field of the ELP. The new bits indicate D_Port mode and optical loopback capabilities. Flow splits at state $D_3$ depending on whether the port is sending or receiving the ELP. If the port is sending the ELP, the D_Port and optical loopback bits will be set in the ELP and a remote port configuration bit is cleared. If the remote port SFP is capable of optical loopback and the port is also in D_Port mode, the optical loopback mode will be set by the remote port in a returned ELP ACC. The port will then transition from $D_3$ to the D_OPTIC_LOOP_BACK_INIT ($D_{3\_1}$) state. If the port is receiving the ELP and the ELP indicates D_Port and optical loopback, it will set the D_Port and optical loopback bits in the ELP ACC and transmit it. The port will then enter optical loopback. The port will also set the remote port configuration bit. Next, the port will transition to D_OPTIC_LOOP_BACK_TARGET ($D_3\_T$) state. However, if either SFP does not support optical loopback while in D_Port mode or both ports are not exchanging ELP and ELP ACC, the procedure will not be able to perform an optical loopback and the port will transition to the D_REM_LOOP_BACK ($D_5$) state.

At the $D_3\_I$ state, the port may transition to two different states. If AC—PORT SCN is received and no other port is running the link test, the port will transition to the D_OPTIC_LOOP_BACK_TEST_INIT ($D_4\_I$) state. However, if AC_PORT SCN is received and another port is running the optical loopback link test, the port will transition to the D_OPTIC_LOOP_BACK_INIT_WAIT ($D_4\_Io$) state and wait in that state. At the $D_4\_Io$ state, the port is either waiting for another port to complete the link test or the switch is going through fabric reconfiguration. The port will remain in the $D_4\_Io$ state until either DOMAIN_VALID SCN is received or the other port completes the link test. Either one of those conditions will cause the port to transition from the $D_4\_Io$ state to the $D_4\_I$ state. While at the $D_4\_I$ state, the port will determine whether or not the optical lookback test was completed successfully. To do this, the port will start the optical loopback link test, enable child process completion signal, and start a timer for worst case scenario, in case the test does not complete successfully. If the port determines that the optical loopback test has failed or was aborted due to timeout, it will set a failure code and will transition back to $D_7$. However, if it determines that the optical loopback test has completed successfully, it will transition to the D_REM_LOOP_BACK ($D_5$) state.

Going back to the $D_3\_T$ state, while at that state, the port is the target of the optical loopback test and will either proceed to the D_OPTIC_LOOP_BACK_TEST_TARGET ($D_4\_T$) state when an AC_PORT SCN is received or transition to the $D_5$ state if it receives an offline SCN. At the $D_4\_T$ state, the port will monitor the optical loopback test, enable child process completion signal, and start a timer for worst case scenario, in case the test does not complete. If the port determines that the optical loopback test has failed or was aborted due to timeout, it will set a failure code and will transition back to $D_7$. However, if it finds that the optical loopback test has completed successfully, it will transition to the $D_5$ state.

When the port goes to the $D_5$ state, the procedure will clear the optical loopback mode in the transition. While at the $D_5$ state, all loopbacks are removed and the port will be toggled to offline and back to online. The port will then go through all the states of E-port initialization from ONLINE to AC_PORT, if the external cable is connected. At this point, the port will check the remote port configuration bit. If cleared, the port was previously the initiator and now needs to be the target. If set, the port was previously the target and now needs to be the initiator. At the $D_5$ state, the port may transition to three different states. If the ELP ACC with D_Port mode bit is set zero, the port will transition back to $D_7$. This means that the port was not able to perform an optical loopback test. As such, the port will be segmented. If the port is the initiator, it will send an ELP with the D_Port and remote optical loopback bits set. If it receives an ELP ACC with the D_Port mode and optical loopback bits set, then the port will transition to the D_REM_LOOP_BACK_INIT ($D_5\_I$) state. If the port is the target and an ELP with the D_Port and optical loopback bits set is received, the port will set the D_Port and optical loopback mode bits in the ELP ACC, enter optical loopback mode, and transition to the D_REM_LOOP_BACK_TARGET ($D_5\_T$) sate.

At the $D_5\_I$ state, the port will either transition to the D_REM_LOOP_BACK_TEST_INIT ($D6\_I$) state or to the D_REM_LOOP_BACK_INIT_WAIT ($D6\_Io$) state. If an AC_PORT SCN is received and no other port is running the link test, then the port will move to the $D6\_I$ state. However, if an AC_PORT SCN is received and another port is running the link test, the port will then transition to $D6\_Io$. The port will remain at the $D6\_Io$ state until either a DOMAIN_VALID SCN command is received or the other port completes the link test. In either case, the port will transition from $D6\_Io$ to the $D6\_I$ state. At the $D6\_I$ state, the procedure starts the link test, enables a child process completion signal, and starts a timer for worst case scenario, in case the test does not complete. The port will transition from $D6\_I$ to $D_7$ whether test is complete or not. If the test fails, the port will transition with the failure code enabled. Otherwise it will transition with the failure code disabled.

Going back to state $D5\_T$, the port at this state will either proceed to D_REM_LOOP_BACK_TEST_TARGET ($D6\_T$), if an AC_PORT SCN is received, or will transition to $D_7$ if it receives an offline SCN. The port monitors the optical loopback test during state $D6\_T$. The port transitions to state DT with the failure code enabled or disabled depending on the test results.

The $D_7$ state is the final state after the tests are completed. There will be a completion code associated with this state. The completion code will be SUCCESS if all the applicable tests completed successfully; otherwise it will contain the failure code, which will be passed to the CLI and will also be displayed as such.

A D_Port will go through all the steps associated with E-port initialization up to link reset in LOOPBACK states. The D_Port mode is exchanged in opmode bits in the ELP payload in remote loopback. If the opmode bit does not match with that of the remote port, the port will be either disabled or segmented. The usual E-port initialization protocol steps performed after link reset will be skipped for a D_Port. During the electrical and optical loopback testing, very high numbers of frames are circulated. The port counts the numbers of frames circulated in each to measure the link traffic.

The D_Port diagnostic tests can be performed on long distance ports across two different fabrics, and the D_Port tests can be performed without merging the fabrics. This can be done a single-mode fiber connecting the long-wave SFPs or through DWDM links.

Accordingly, the D_Port diagnostic tests can be utilized to perform link level sanity tests in Fibre Channel networks. Such testing includes performing an electrical loopback test, an optical loopback test, and a link traffic test. To achieve this diagnostic testing, two ports at each end of a link are first identified and then statically configured by a user. The ports will be configured as D_Ports and as such will be completely isolated from the fabric with no data traffic flowing through them. The ports are then used to send test frames to perform the diagnostic tests. In this manner, the D_Port diagnostic tests improve testing capabilities for detecting single link faults.

Although described above generally in terms of FC fabrics and using FC terminology, the problems and techniques for graceful decommissioning of ports are not limited to FC fabrics and protocols, but may be implemented using similar techniques to those described above in Ethernet and other types of networks, including lossless networks using IEEE Data Center Bridging.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A device comprising:
a processor; and
a network port coupled to the processor, the network port including a media interface module coupled to the processor;
wherein the media interface module includes the capabilities to perform electrical loopback testing and optical loopback testing;
wherein the processor is adapted to:
configure the media interface module to perform a loopback of electrical signals when operating in a diagnostic mode;
provide incoming electrical signals to the media interface module to perform an electrical loopback test;
configure, after performing the electrical loopback test, the media interface module to perform an optical loopback test with a second media interface module of a second device when operating in the diagnostic mode; and
provide test frames to the network port to initiate the optical loopback test with the second media interface module when the second media interface module is configured to perform the loopback of incoming optical signals and is operating in the diagnostic mode.

2. The device of claim 1, wherein the processor is further adapted to:
receive, after completing the first optical loopback test, a diagnostic frame indicating the second media interface module is operating in the diagnostic mode and is capable of initiating a second optical loopback test; and
in response to receiving the diagnostic frame, returns a diagnostic accept frame indicating the media interface module is operating in the diagnostic mode and is configured to perform the loopback of incoming optical signals.

3. The device of claim 1, wherein the processor is further adapted to:
provide, after performing the electrical loopback test, a diagnostic frame indicating operation in the diagnostic mode and the media interface module is capable of performing optical loopback testing;
receive a diagnostic accept frame indicating the second media interface module is operating in the diagnostic mode and the second media interface module is capable of performing the loopback of incoming optical signals, and
wherein the diagnostic frame and the diagnostic accept frame exchange occurs prior to the processor providing the test frames to the network port.

4. The device of claim 1, wherein the media interface module is configured to perform the optical loopback test when the electrical loopback test passes.

5. The device of claim 1, wherein the device is a switch.

6. The device of claim 1, wherein the device is a host bus adaptor.

7. The device of claim 1, wherein the network port and media interface module conform to Fibre Channel standards.

8. A network comprising:
a first device including a first processor and a network port coupled to the first processor, the network port including a first media interface coupled to the first processor;
a second device including a second processor and a second network port coupled to the second processor, the second network port including a second media interface coupled to the second processor; and
a link connected to the first device media interface and the second device media interface;
wherein the first and the second device media interface include the capability to perform electrical loopback testing and optical loopback testing in a diagnostic mode; and
wherein the first processor is adapted to:
configure the first device media interface module to perform a loopback of electrical signals when operating in the diagnostic mode;
provide incoming electrical signals to the first media interface module to perform an electrical loopback test;
configure, after performing the electrical loopback test, the first device media interface to perform an optical loopback test between the second device media interface when the network port is operating in the diagnostic mode; and
initiate an optical loopback test between the first device media interface and the second device media interface by providing test frames to the network port for transmission when the second device media interface is configured to perform the loopback of incoming optical signals and the second network port is operating in the diagnostic mode.

9. The network of claim 8, wherein the first device media interface is configured to perform the optical loopback test when the electrical loopback test passes.

10. The network of claim 8, wherein the second processor is adapted to initiate a second optical loopback test between the first device media interface and the second device media interface by providing a second set of test frames to the second network port for transmission of the second set of test frames onto the link when the first device media interface is configured to perform the loopback of incoming optical signals.

11. The network of claim 10,
wherein the second processor is adapted to provide a diagnostic frame indicating the second network port is operating in the diagnostic mode and the second device media is configured to perform optical loopback testing over the link;
wherein the first processor is adapted to receive the diagnostic frame and in response, returns a diagnostic accept frame indicating the network port is operating in the diagnostic mode and the first device media interface is configured to perform the loopback of incoming optical signals,
wherein the second processor is adapted to receive the diagnostic accept frame and in response, initiates the second optical loopback test, and
wherein the diagnostic frame and diagnostic accept frame exchange occurs prior to the second processor initiating the second optical loopback test.

12. The network of claim 8,
wherein the first processor is adapted to provide a diagnostic frame indicating the network port is operating in the diagnostic mode and the first device media interface is capable of performing loopback testing over the link;

wherein the second processor is adapted to receive the diagnostic frame and in response, returns a diagnostic accept frame indicating the second network port is operating in the diagnostic mode and the second device media interface is capable of performing the loopback of incoming optical signals, wherein the first processor is adapted to receive the diagnostic accept frame and in response, determines whether the second processor is capable of configuring the second media interface to perform the loopback of incoming optical signals and the second network port is operating in the diagnostic mode and configures the first device media interface to initiate the optical loopback test, and wherein the diagnostic frame and the diagnostic accept frame exchange occurs prior to the first processor initiating the optical loopback test and after performing the electrical loopback test.

13. The network of claim 8, wherein each processor set its respective network port to the diagnostic mode prior to the first processor initiating the optical loopback test between the first device media interface and the second device media interface.

14. The network of claim 8, wherein the first and second devices are switches.

15. The network of claim 8, wherein the first device is a host bus adaptor and the second device is a switch.

16. The network of claim 8, wherein the first and the second network ports and the first and the second device media interfaces conform to Fibre Channel standards.

17. A method comprising:
configuring the media interface to perform a loopback of electrical signals when operating in a diagnostic mode;
providing incoming electrical signals to the media interface module to perform an electrical loopback test;
providing, after performing the electrical loopback test, a diagnostic frame indicating diagnostic mode and capability of the media interface to perform an optical loopback test for a network port, the network port including the media interface; wherein the diagnostic frame is provided after the media interface is configured to not loopback incoming optical signals;
transmitting the diagnostic frame to a second media interface;
receiving a diagnostic accept frame from the second media interface indicating the second media interface is in diagnostic mode and is capable of performing loopback of incoming optical signals; and
receiving loopback optical frames at the network port after the media interface is configured to initiate the optical loopback test between the media interface and the second media interface.

18. The method of claim 17, further comprising:
receiving, after completing the first optical loopback test, a second diagnostic frame indicating the second media interface module is operating in the diagnostic mode and is capable of initiating a second optical loopback test; and
in response to receiving the diagnostic frame, returning a second diagnostic accept frame indicating the media interface module is operating in the diagnostic mode and is configured to perform the loopback of incoming optical signals.

19. A method comprising:
configuring a media interface not to loopback incoming optical signals;

receiving a diagnostic frame indicating diagnostic mode and capability of a second media interface to perform optical loopback testing, wherein the diagnostic frame being received after the media interface is configured to not loopback incoming optical signals;
returning, in response to the diagnostic frame, a diagnostic accept frame indicating the media interface is in diagnostic mode and capable of performing optical loopback;
configuring the media interface to loopback incoming optical signals;
receiving incoming optical signals for an optical loopback test between the media interface and the second media interface, wherein the optical signals are transmitted by the second media interface after determining the media interface is configured to loopback incoming optical signals;
providing, after completing the optical loopback test, a second diagnostic frame indicating the media interface module is operating in the diagnostic mode and is capable of initiating a second optical loopback test; and
in response to providing the diagnostic frame, receiving a second diagnostic accept frame indicating the second media interface module is operating in the diagnostic mode and is configured to perform the loopback of incoming optical signals.

20. The method of claim 19, wherein the diagnostic frame and diagnostic accept frame exchange occurs prior to providing frames to the network port for transmission.

21. The method of claim 19, further comprising configuring the media interface to loopback incoming electrical signals and providing electrical signals to the configured media interface when the media interface is configured to loopback electrical signals prior to performing the optical loopback test.

22. A method comprising:
configuring a media interface module to perform a loopback of electrical signals when operating in a diagnostic mode, wherein the media interface module includes capabilities to perform electrical loopback testing and optical loopback testing;
providing incoming electrical signals to the media interface module to perform an electrical loopback test;
configuring, after performing the electrical loopback test, the media interface module to perform an optical loopback test with a second media interface module of a second device when operating in the diagnostic mode; and
providing test frames to the network port to initiate the optical loopback test with the second media interface module when the second media interface module is configured to perform the loopback of incoming optical signals and is operating in the diagnostic mode.

23. The method of claim 22, further comprising:
receiving, after completing the first optical loopback test, a diagnostic frame indicating the second media interface module is operating in the diagnostic mode and is capable of initiating a second optical loopback test; and
in response to receiving the diagnostic frame, returning a diagnostic accept frame indicating the media interface module is operating in the diagnostic mode and is configured to perform the loopback of incoming optical signals.

* * * * *